(12) United States Patent
Zhang

(10) Patent No.: US 10,243,333 B2
(45) Date of Patent: Mar. 26, 2019

(54) SECTIONED AND REMOVABLE WIRE STRIPPER SHAFT

(71) Applicant: Xiaozhong Zhang, Nashua, NH (US)

(72) Inventor: Xiaozhong Zhang, Nashua, NH (US)

(*) Notice: Subject to any disclaimer, the term of this patent is extended or adjusted under 35 U.S.C. 154(b) by 534 days.

(21) Appl. No.: 14/456,332

(22) Filed: Aug. 11, 2014

(65) Prior Publication Data

US 2016/0043534 A1 Feb. 11, 2016

(51) Int. Cl.
*H02G 1/12* (2006.01)

(52) U.S. Cl.
CPC ............. *H02G 1/126* (2013.01); *H02G 1/127* (2013.01)

(58) Field of Classification Search
CPC ...... H02G 1/126; H02G 1/127; H02G 1/1285; H02G 1/1217; H02G 9/065; H02G 1/12
See application file for complete search history.

(56) References Cited

U.S. PATENT DOCUMENTS

| | | | |
|---|---|---|---|
| 292,978 A * | 2/1884 | Braun | A47B 91/024 |
| | | | 403/309 |
| 1,661,056 A | 2/1928 | Stack | |
| 1,673,196 A | 6/1928 | Lawrence et al. | |
| 1,725,114 A | 8/1929 | Van Gelderen | |
| 2,239,755 A | 4/1941 | Montgomery | |
| 2,470,282 A * | 5/1949 | Baker | B23B 23/02 |
| | | | 269/270 |
| D154,715 S | 8/1949 | Sigoda | |
| 2,513,262 A | 6/1950 | Carpenter | |
| 2,554,126 A | 5/1951 | Schwartz | |
| 2,624,317 A | 1/1953 | Murray | |
| 2,827,811 A | 3/1958 | Dymeck | |
| 3,044,170 A | 7/1962 | Agombar et al. | |
| 3,172,615 A | 3/1965 | Manson | |
| 3,309,947 A | 3/1967 | Denney | |
| 3,535,785 A | 10/1970 | Matthews | |
| 3,606,407 A * | 9/1971 | Pendergast | F16D 1/04 |
| | | | 15/179 |
| 3,611,571 A | 10/1971 | Belling | |
| 3,624,901 A | 12/1971 | Pattit | |
| 3,821,911 A * | 7/1974 | Seme | B21D 28/10 |
| | | | 83/51 |
| 3,977,277 A | 8/1976 | Baston et al. | |

(Continued)

FOREIGN PATENT DOCUMENTS

GB 722856 2/1955

*Primary Examiner* — Robert J Scruggs
(74) *Attorney, Agent, or Firm* — Maine Cernota & Rardin

(57) ABSTRACT

A disclosed wire stripper device comprises a sectioned shaft having a removable section thereof configured to have a first joint between a first bearing end of the shaft and a midsection and a second joint between the midsection and a second bearing end of the shaft. The first joint and second joints comprise a midsection portion at each joint and a complementary shaft portion of the respective first and second bearing ends. A first removable coupling is configured to hold the first joint portions together and a second coupling configured to hold the second joint portions together during a rotation of the sectioned shaft and allow a decoupling of the first and second joint portions otherwise. A method for the maintenance of a wire stripper device is disclosed comprising removing a section of a sectioned shaft by removing the coupling collars retaining the joints of the shaft sections.

13 Claims, 8 Drawing Sheets

(56) References Cited

U.S. PATENT DOCUMENTS

| | | |
|---|---|---|
| 4,187,745 A | 2/1980 | Lambert |
| 4,339,967 A | 7/1982 | Greenburg |
| 4,416,563 A * | 11/1983 | Zemke ................... F16D 1/04 |
| | | 403/14 |
| 4,656,893 A | 4/1987 | Hudson |
| 4,800,536 A * | 1/1989 | Dittrich ............... B29C 47/0801 |
| | | 366/78 |
| 4,809,566 A | 3/1989 | Campanella |
| 4,951,530 A | 8/1990 | Cross |
| 5,050,302 A | 9/1991 | Mills |
| 5,143,477 A * | 9/1992 | Kanehira ................. F01D 5/02 |
| | | 403/341 |
| D343,626 S | 1/1994 | Fan |
| 5,445,051 A | 8/1995 | Carpenter |
| 5,542,327 A | 8/1996 | Schultz |
| 5,797,299 A | 8/1998 | Long, Jr. |
| 5,979,286 A | 11/1999 | Burth |
| 5,988,018 A | 11/1999 | Tolbert et al. |
| 6,018,873 A | 2/2000 | McClellan |
| 6,217,251 B1 * | 4/2001 | Kato ...................... F16B 17/004 |
| | | 403/341 |
| 6,581,291 B1 | 6/2003 | Tarpill |
| 6,643,448 B1 | 11/2003 | Brewer et al. |
| 6,877,927 B2 * | 4/2005 | Paulin ...................... F16D 1/04 |
| | | 403/293 |
| 7,171,753 B2 | 2/2007 | Korczak |
| 7,360,566 B2 | 4/2008 | Chang |
| 8,459,317 B2 | 6/2013 | Hu |
| 2003/0015080 A1 | 1/2003 | Adams |
| 2003/0196520 A1 | 10/2003 | Locher |
| 2007/0074409 A1 | 4/2007 | Hsu |
| 2010/0198353 A1 * | 8/2010 | Pope ................... A61F 2/30767 |
| | | 623/17.11 |
| 2010/0319199 A1 | 12/2010 | Mullaney |
| 2011/0010945 A1 | 1/2011 | Delafosse |
| 2012/0167719 A1 | 7/2012 | Newman |
| 2013/0043218 A1 * | 2/2013 | Lancaster-Larocque ................... |
| | | B23D 57/0023 |
| | | 219/69.17 |
| 2013/0133203 A1 | 5/2013 | Stocklein |
| 2013/0133204 A1 | 5/2013 | McDannell et al. |

\* cited by examiner

Prior Art

SECTIONED AND REMOVABLE WIRE STRIPPER SHAFT

BACKGROUND OF THE INVENTION

Many conventional powered wire strippers use one or multiple stationary or rotating sharp blades to cut open the wire insulation for metal reclamation. The blades are typically mounted on a rotating shaft having ball bearings. All blades, no matter what they are made of or how well they are made, will eventually get dull after extensive use. Also, the accidental feed of hard objects into the stripper is a frequent event that often leads to chipping the cutting edge of a blade.

However, when blades need to be replaced, the conventional multiple-blade stripper requires the removal of the whole shaft and the bearing on the shaft ends, which is time consuming and requires special tools and skills. Anytime the shaft and the bearings are removed there is a risk of damaging components and losing valuable operational time in wire reclamation.

Conventional wire stripper shaft repair or replacement requires removing the top cover and side covers of the stripper and removing a retaining clip and removing the drive chain in order to remove or sharpen blades on the monolithic shaft. In order to pull the supporting block off the bearing, a special pulling tool is required. The process is repeated in reverse order to install the shaft and bearings with a special tube and hammer. The supporting block is reinstalled with a hammer in order to drop in the assembly. The retaining clip is reinserted and the chain is reconnected. The top and two side covers are put back into place. The process is time consuming and labor intensive.

Conventional blade removal and installation also requires training and practice. Part damage to the shaft, the cutting blades and the bearings is common, especially after repeated procedures. Not only are trained man hours lost but machine downtime factors into the total cost of removing or sharpening the cutting blades. None of the prior art solutions can offer satisfactory results because they don't offer a quick and easy way to remove a stripper shaft for cutting blade maintenance. Therefore, there has been a long felt need in the market for a powered wire stripper capable of quick and inexpensive shaft maintenance unmet until the Applicant's present disclosure.

SUMMARY OF THE INVENTION

A wire stripper device is disclosed. The disclosed device comprises a sectioned shaft having a removable section thereof. The sectioned shaft has at least a first joint between a first bearing end of the shaft and a second bearing end of the shaft, the first joint comprising a shaft portion of the first bearing end of the shaft and a complementary shaft portion of a midsection of the shaft.

A wire stripper device also comprises a sectioned shaft having a removable section thereof configured to have a first joint between a first bearing end of the shaft and a midsection and a second joint between the midsection and a second bearing end of the shaft. The first joint and second joints comprise a midsection portion at each joint and a complementary shaft portion of the respective first and second bearing ends.

An embodiment further comprises a first removable coupling configured to hold the first joint portions together and a second coupling configured to hold the second joint portions together during a rotation of the sectioned shaft and allow a decoupling of the first and second joint portions otherwise.

A method for the maintenance of a wire stripper device is disclosed. The method comprises removing a section of a sectioned shaft configured to receive at least one cutting blade, the sectioned shaft configured to have a first joint between a first bearing end of the shaft and a midsection and a second joint between the midsection and a second bearing end of the shaft, the first joint and second joints comprising a midsection portion at each joint and a complementary shaft portion of the respective first and second bearing ends.

Other aspects and advantages of embodiments of the disclosure will become apparent from the following detailed description, taken in conjunction with the accompanying drawings, illustrated by way of example of the principles of the disclosure herein.

Figure 1:
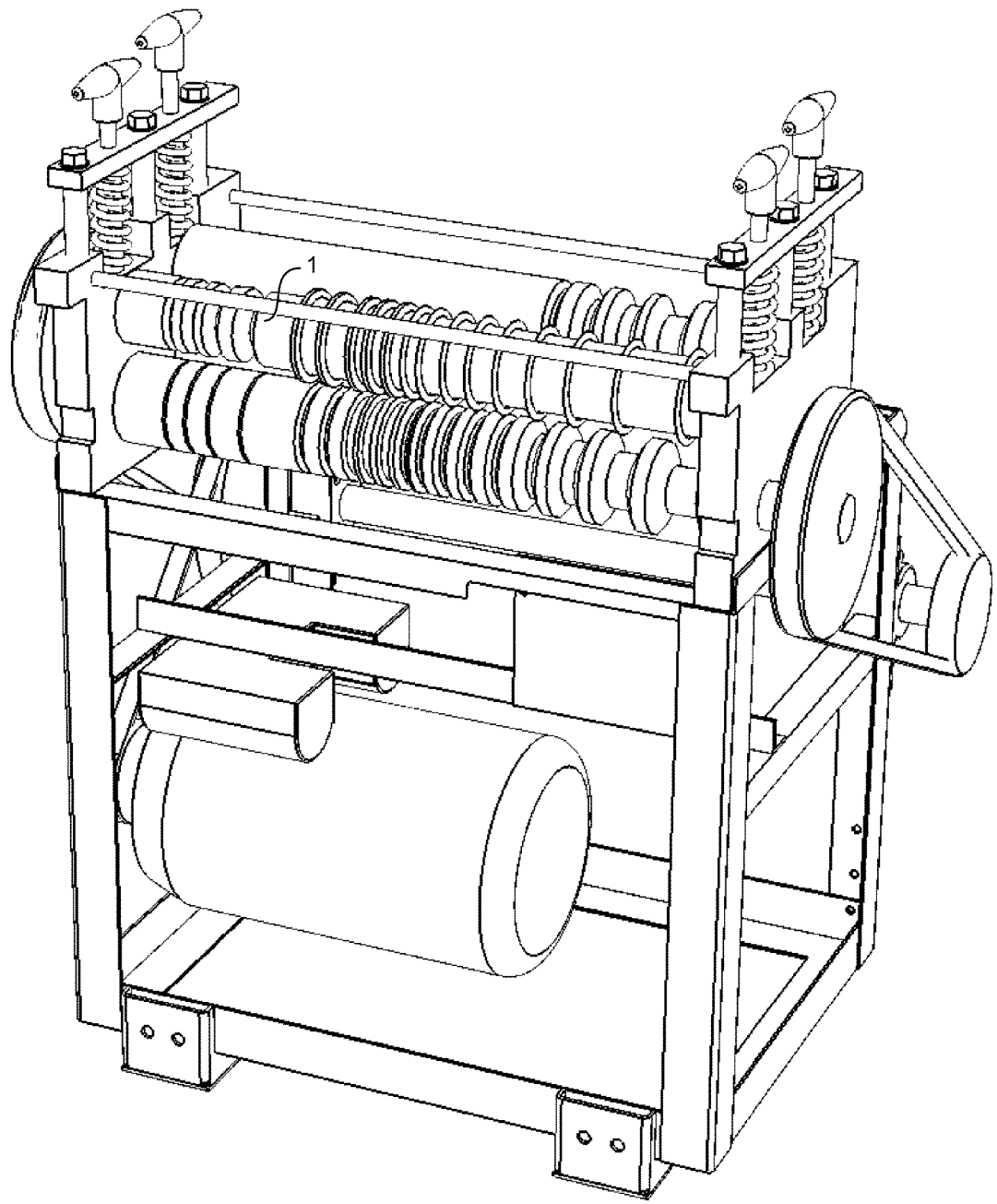
FIG. 1 is a partially exposed perspective view of a wire stripper machine common to the prior art, including a shaft for mounting cutting blades and motor driven interfacing shafts.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

This disclosure comprises a wire stripper that has one or more blades mounted on a shaft. The shaft can either be stationary or rotating. This disclosure comprises an embodiment comprising a shaft of three sections. Left and right sections interface with the drive and support bearing mechanisms of the machine. The center section carries all the blades. The three sections are mechanically joined by two sets of shaft couplings, which can be quickly aligned to engage and disengage joints between the shaft sections. The couplings obviate the need to remove the complete shaft and bearings in order to service a cutting blade.

Throughout the present disclosure, the terms 'collar' and 'coupling' are used interchangeably to describe a fitting configured to hold joint portions together during a rotation of the sectioned shaft and allow a decoupling of the joint portions otherwise. The term 'portion' used in the present disclosure refers to a part of the sectioned shaft which is immediately adjacent a joint thereof and may have varying geometrical shapes depending on a complementary or matching part. The terms 'midsection' and 'longitudinal center' also are used interchangeably.

FIG. 1 is a partially exposed perspective view of a wire stripper machine common to the prior art, including a shaft for mounting cutting blades and motor driven interfacing shafts. The wire stripper machine includes a non-sectioned shaft 1 mounted with cutting blades. Powered multiple-blade strippers may have four rotating shafts of which the upper-front and lower-back shafts have blades. The other two shafts may only have matching grooves. Some models are designed to have the entire upper-front shaft detachable from the machine because it has mostly blades. The lower-back shaft has fewer blades and may be made detachable as a non-sectioned shaft in other models.

Figure 2:
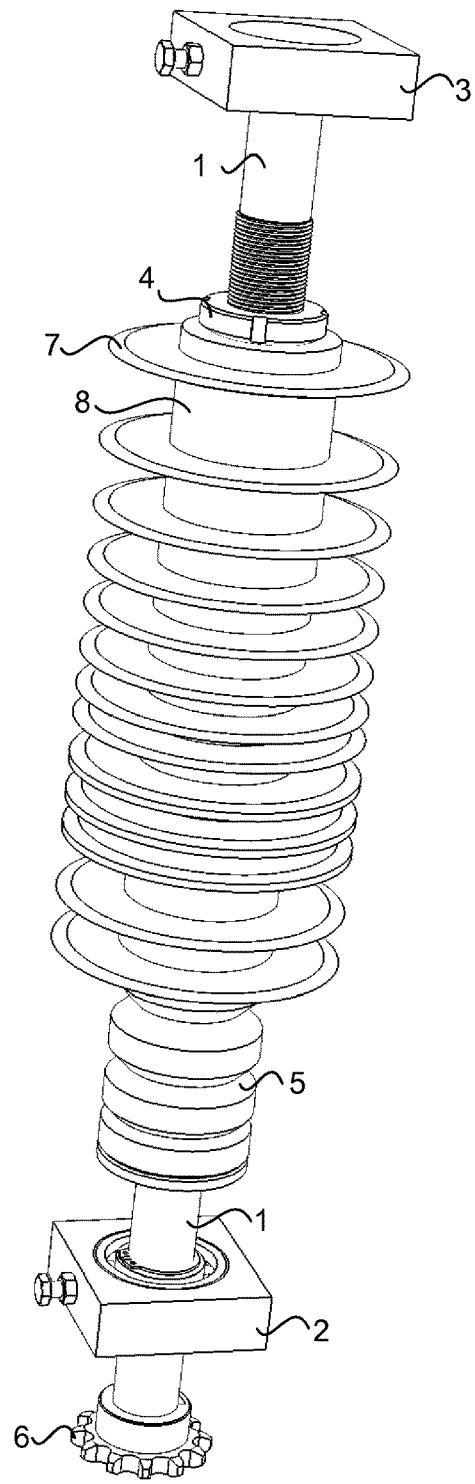
FIG. 2 is a perspective view of a non-sectioned shaft for mounting cutting blades and spacers common to the prior art for motor driven wire stripper machines.

FIG. 2 is a perspective view of a non-sectioned shaft for mounting cutting blades and spacers common to the prior art for motor driven wire stripper machines. Bearings 2 and 3 each hold an end of the non-sectioned shaft 1 in rotation and a nut 4 holds the blades and spacers there between in mechanical proximity on the non-sectioned shaft 1. The grooved spacer 5 also acts as a retainer for the blades and spacers depicted. The sprocket 6 allows the shaft 1 to be driven via a chain attached to a motor. A single blade 7 and a single spacer 8 are referenced in the present drawing but are typical of the other blades and spacers depicted.

Figure 3:
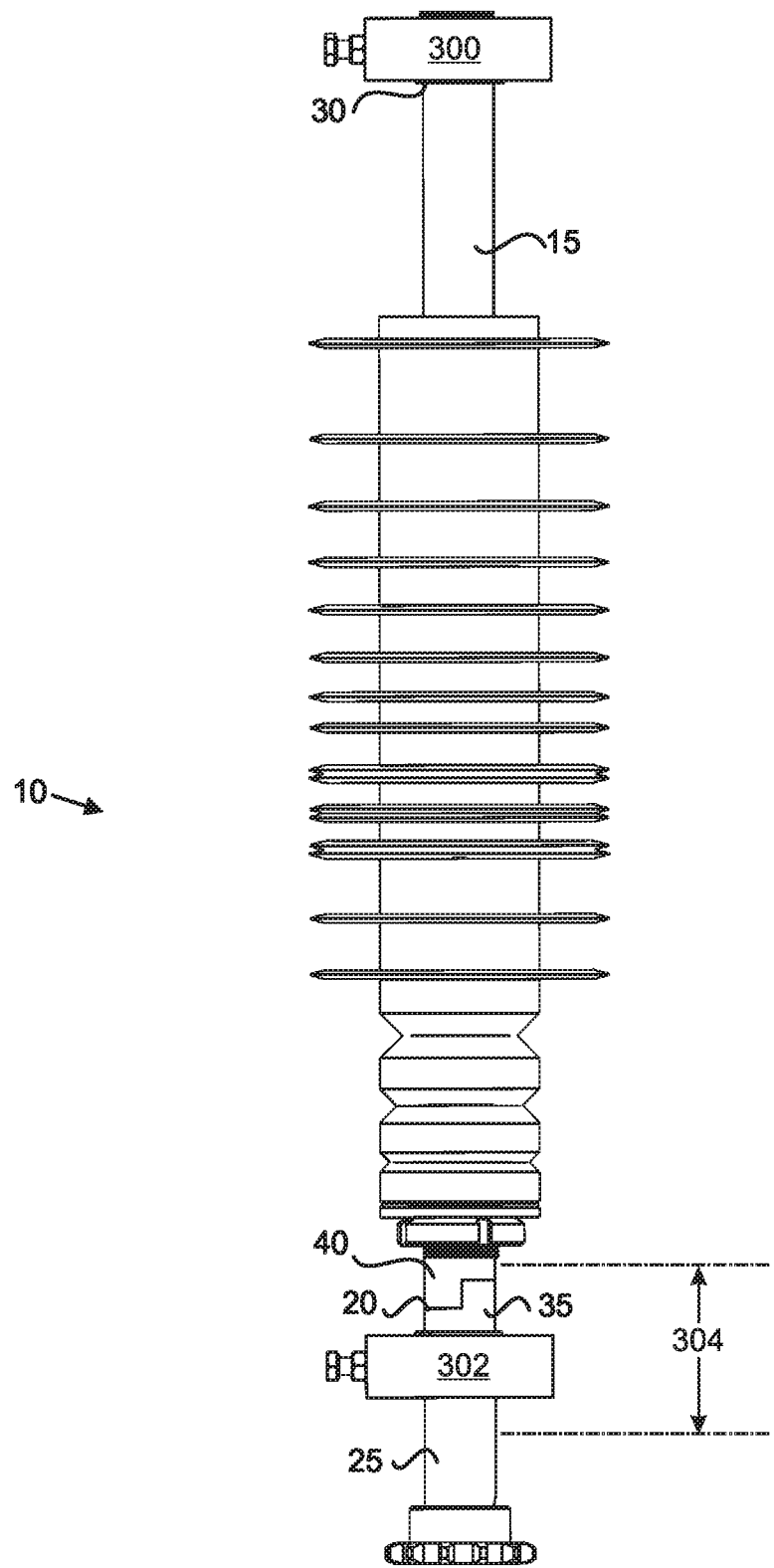
FIG. 3 is a front elevational view of a sectioned and removable wire stripper shaft comprising a joint between a shaft bearing end and a midsection according to an embodiment of the present disclosure.

FIG. 3 is a front elevational view of a sectioned and removable wire stripper shaft comprising a joint between a shaft bearing end and a midsection according to an embodiment of the present disclosure. Same or similar reference numbers may be used for same or similar disclosed features in other figures. The disclosed device comprises a cylindrical, sectioned shaft 10 having a removable section 15 thereof. The sectioned shaft 10 is supported at a first bearing end 25 by a first bearing 302 and at a second bearing end 30 by a second bearing 300. The shaft 10 has at least a first joint 20 between the first bearing end 25 of the shaft and the second bearing end 30 of the shaft. The first joint 20 comprises a shaft portion 35 of the first bearing end 25 of the shaft and a complementary shaft portion 40 of a midsection or longitudinal center of the shaft 10. It can be seen in the figure that when the first joint 20 is fully assembled, as illustrated, the diameter of the shaft 10 is uniform along a first uniform length 304 that extends through the first bearing 302 and through the first joint 20.

In the embodiment of FIG. 3, the bearing portion 35 and the complementary shaft portion 40 terminate in abutting end structures at the first joint 20, where the end structures consist of vertical planar surfaces that are complementary and abutting so as to form a half-lap configuration. The shaft portion and the complementary shaft portions at the first joint may comprise a butt-end configuration. Other disclosed joint configurations are discussed in detail below. However, the first joint 20 may be hinged in another embodiment of the present disclosure. The hinge may be configured to allow a tangential movement of one of the bearing ends relative to the other bearing end so that the removable section 15 may be detached from the shaft 10 for cutting blade maintenance.

Once the removable shaft is detached from the other shaft sections the cutting blades and the spacers may be removed from the shaft. The cutting blades may be serviced once removed from the sectioned shaft. The bearing end of the shaft comprising the chain sprocket is left in place and the other bearing end may be lifted out with the bearing still intact. Maintenance is therefore minimized and inadvertent damage to the machine is avoided.

Figure 4:
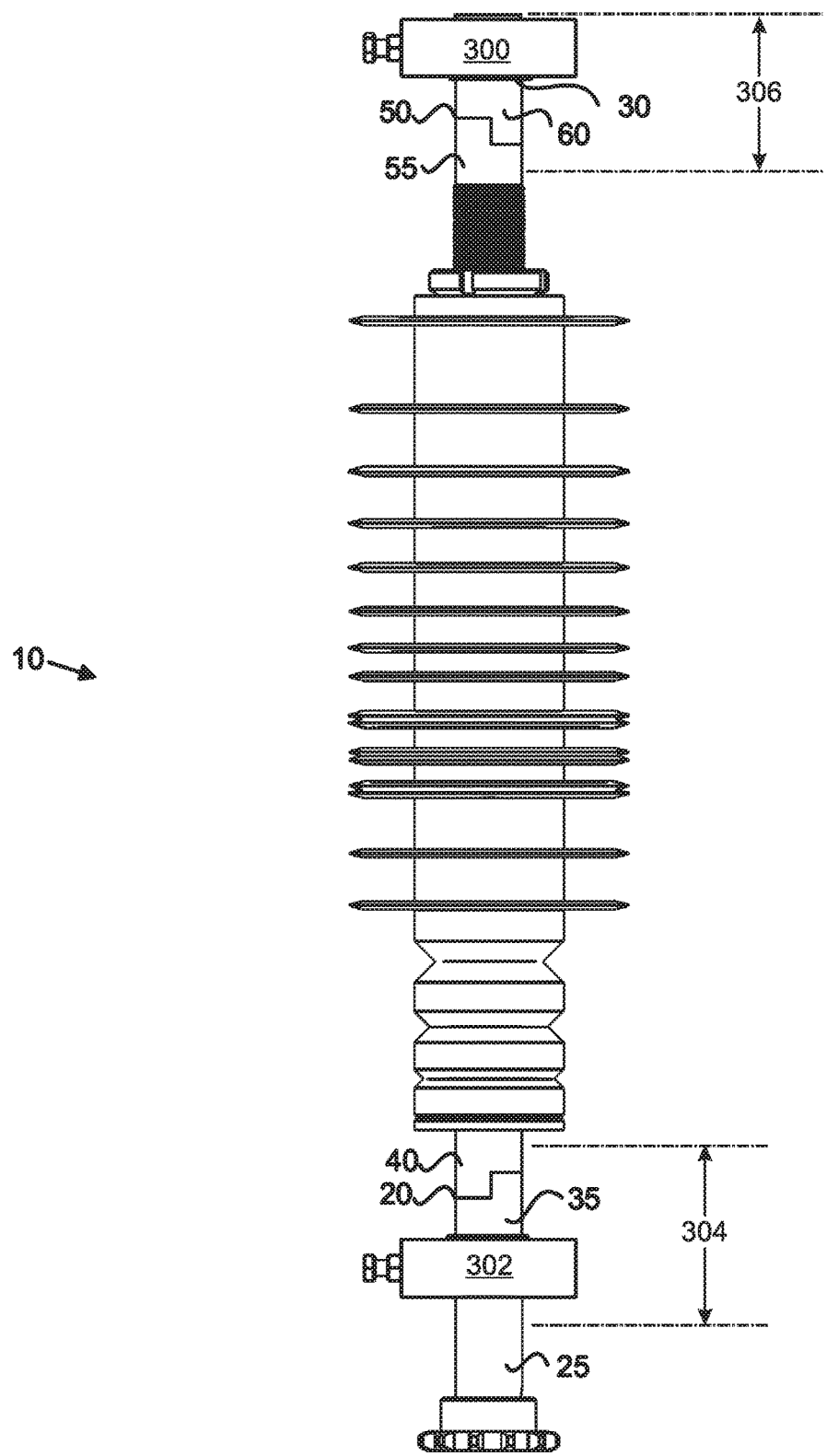
FIG. 4 is a perspective view of a sectioned and removable wire stripper shaft comprising two joints and the removable and sectioned shaft according to an embodiment of the present disclosure.

FIG. 4 is a perspective view of a sectioned and removable wire stripper shaft comprising two joints and the removable and sectioned shaft according to an embodiment of the present disclosure. The wire stripper device also comprises a sectioned shaft 10 configured to have a first joint 20 between a first bearing end 25 of the shaft and a midsection or longitudinal center of the sectioned shaft 10 and a second joint 50 between the midsection and a second bearing end 30 of the shaft 10. The second joint comprises a shaft midsection portion 55 and a complementary bearing end portion 60. It can be seen in the figure that when the first joint 20 is fully assembled, as illustrated, the diameter of the shaft 10 is uniform along a first uniform length 304 that extends through the first bearing 302 and through the first joint 20. It can further be seen in the figure that when the second joint 50 is fully assembled, as illustrated, the diameter of the shaft 10 is uniform along a second uniform length 306 that extends through the second bearing 300 and through the second joint 50.

Figure 5:
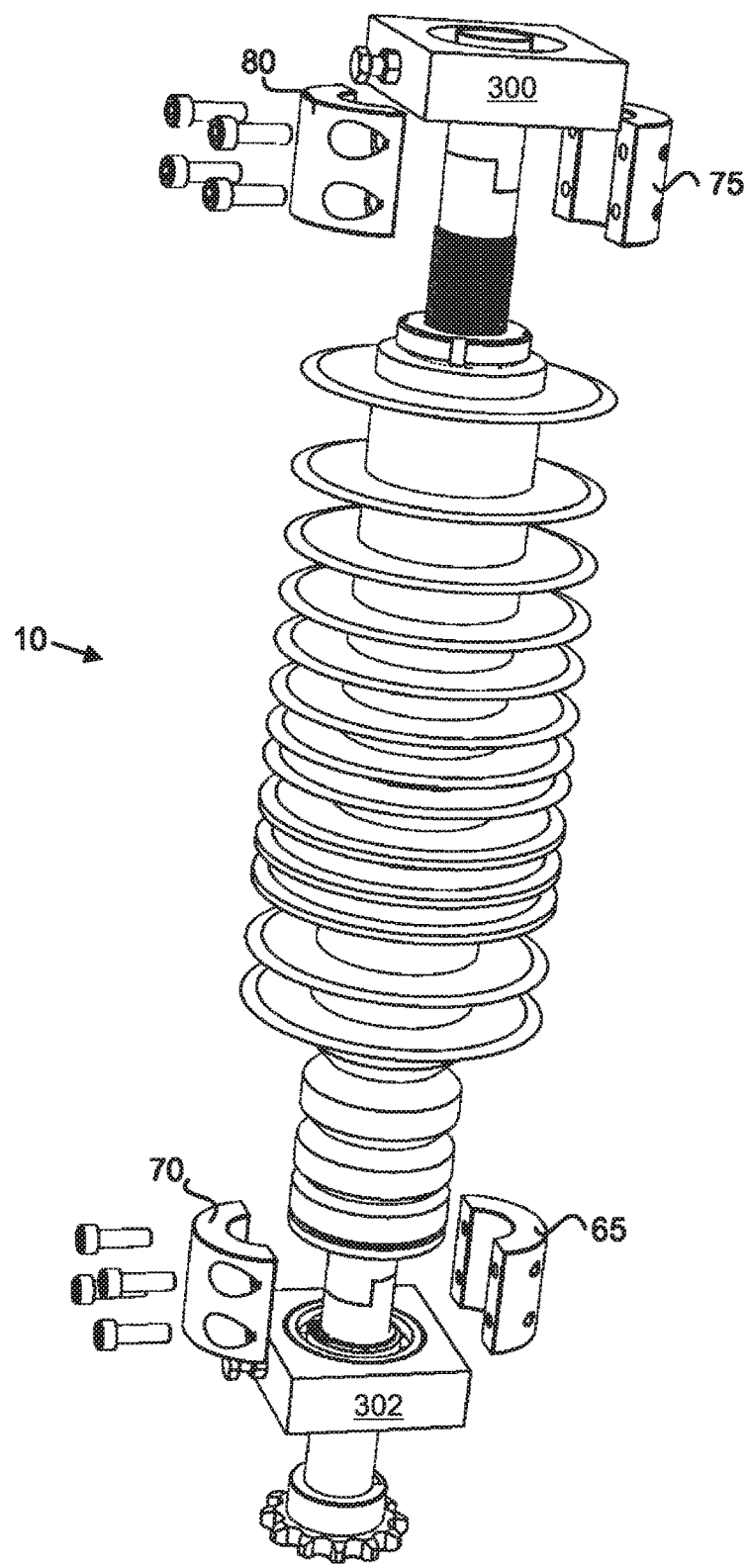
FIG. 5 is a front elevational view of a sectioned and removable wire stripper shaft comprising two joints and two assembled collars or couplers in accordance with an embodiment of the present disclosure.

FIG. 5 is a front elevational view of a sectioned and removable wire stripper shaft comprising two joints and two assembled collars or couplers in accordance with an embodiment of the present disclosure. Same or similar reference numbers may be used for same or similar disclosed features in other figures. The first collar or coupler comprises two parts 65 and 70 held together by fasteners and the second collar or coupler also comprises two parts 75 and 80 held together by fasteners. The collar couplings align with and over the joints of the disclosed sectioned shaft to keep the respective shaft portions adjacent during a rotation of the sectioned shaft 10 and allows a decoupling of the respective joint portions otherwise.

In an embodiment of the disclosure, a width of each joint coupling is configured to be equal to or wider than a joinder of the bearing end portion 35 and the complementary shaft portion 40 depicted in FIG. 3. The width of the coupling enables it to mechanically support the joint in rotation with minimal frictional forces between the operating parts.

Figure 6:
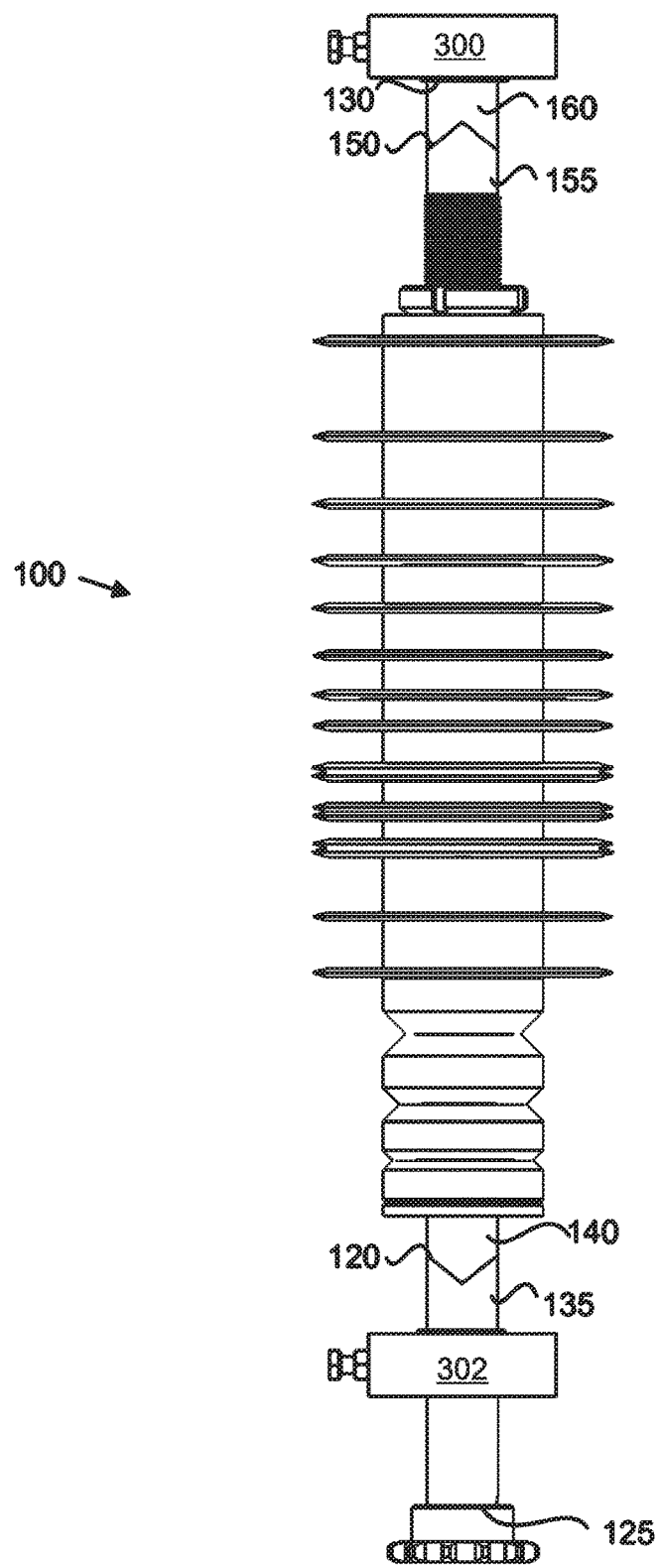
FIG. 6 is a front elevational view of a sectioned and removable wire stripper shaft comprising two joints facing away from a longitudinal center of the shaft in accordance with an embodiment of the present disclosure.

FIG. 6 is a front elevational view of a sectioned and removable wire stripper shaft comprising two joints facing away from a longitudinal center of the shaft in accordance with an embodiment of the present disclosure. The depicted wire stripper device comprises a sectioned shaft 100 configured to have a first joint 120 between a first bearing end 125 of the shaft and a midsection or longitudinal center of the sectioned shaft 100 and a second joint 150 between the midsection and a second bearing end 130 of the shaft 100. The first joint 120 comprises a shaft midsection portion 140 and a complementary bearing end portion 135. The second joint 150 comprises a shaft midsection portion 155 and a complementary bearing end portion 160.

In an embodiment of the disclosed wire stripper device, the shaft portion and the complementary shaft portions at one of the first and second joints comprise a conical configuration. The shaft portion and the complementary shaft portions at one of the first and second joints may also comprise a cylindrical wedge configuration.

An embodiment of the disclosure may comprise the first joint and the second joint configured in a conical midsection facing a respective bearing end and a complementary respective first and second bearing end, an altitude of the conical midsection configured to be less than a radius thereof.

Figure 7:
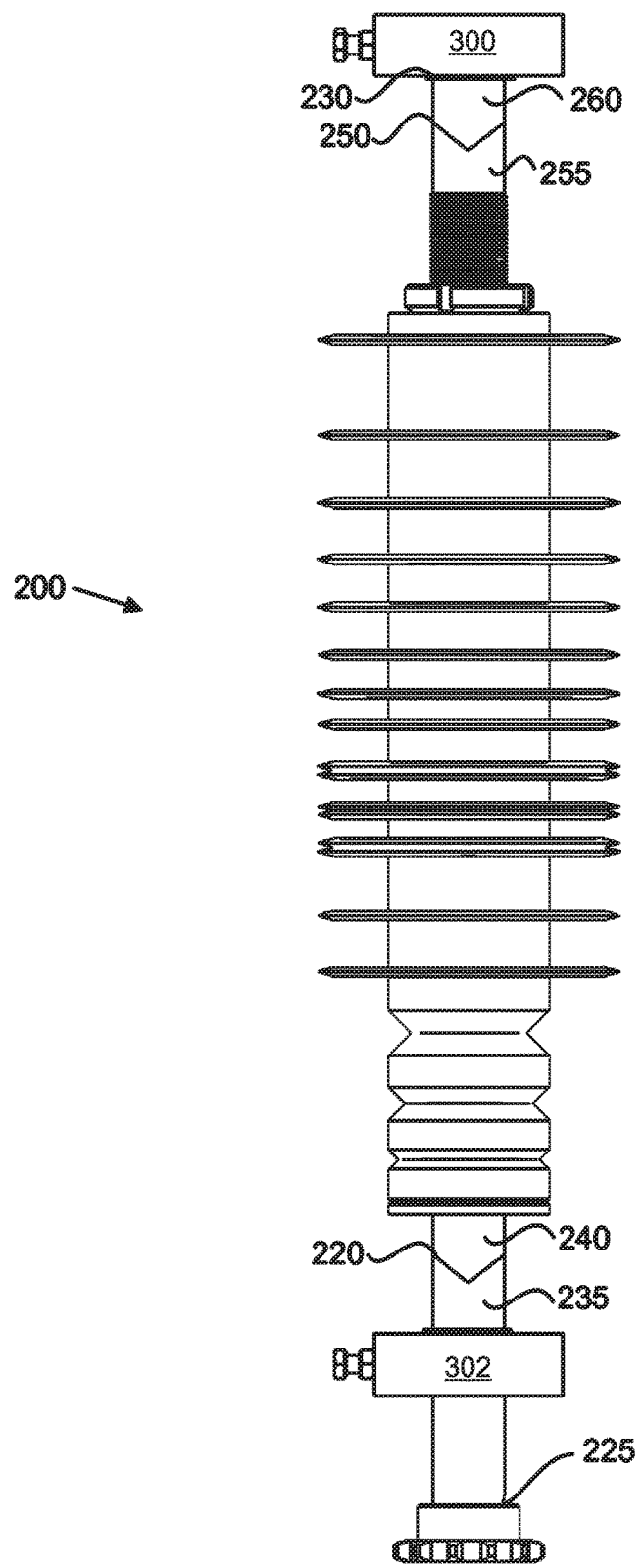
FIG. 7 is a front elevational view of a sectioned and removable wire stripper shaft comprising two joints facing a single bearing in accordance with an embodiment of the present disclosure.

FIG. 7 is a front elevational view of a sectioned and removable wire stripper shaft comprising two joints facing a single bearing in accordance with an embodiment of the present disclosure. Same or similar reference numbers may be used for same or similar disclosed features in other figures. The depicted wire stripper device comprises a sectioned shaft 200 configured to have a first joint 220 between a first bearing end 225 of the shaft and a midsection or longitudinal center of the sectioned shaft 200 and a second joint 250 between the midsection and a second bearing end 230 of the shaft 200. The first joint 220 comprises a shaft midsection portion 240 and a complementary bearing end portion 235. The second joint 250 comprises a shaft midsection portion 255 and a complementary bearing end portion 260. The shaft comprises two joints facing a single bearing precludes and operator installing the sectioned shaft in a different position than for what it was originally manufactured.

Figure 8:
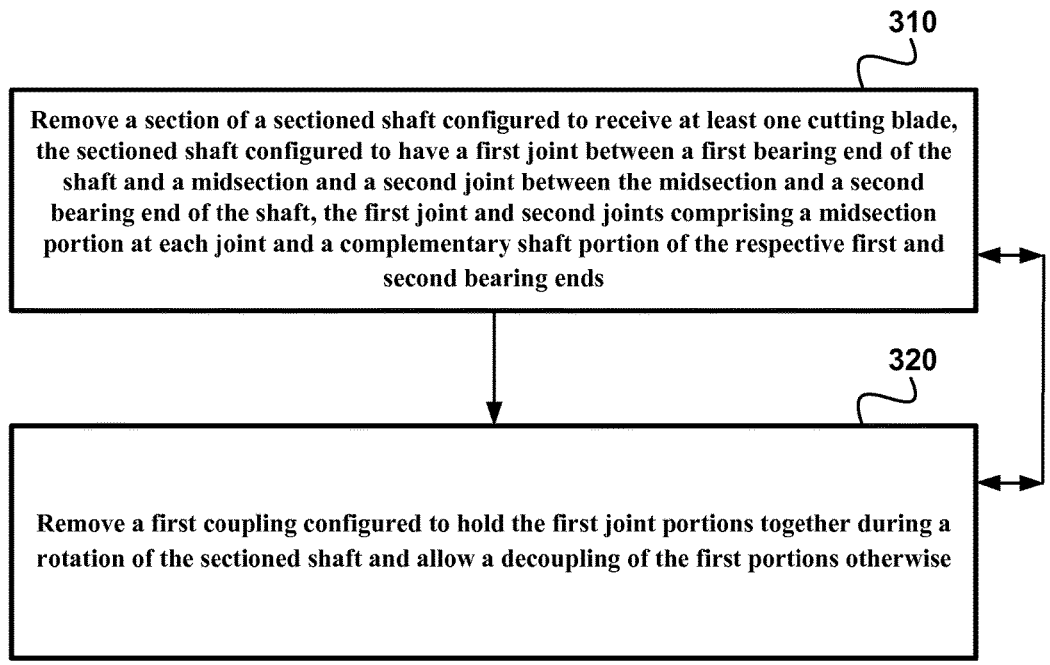
FIG. 8 is a block diagram of a method for the maintenance of a wire stripper device, including removing a section configured to receive at least one cutting blade in accordance with an embodiment of the present disclosure.

FIG. 8 is a block diagram of a method for the maintenance of a wire stripper device, including removing a section configured to receive at least one cutting blade in accordance with an embodiment of the present disclosure. The method includes removing 310 a section of a sectioned shaft configured to receive at least one cutting blade, the sectioned shaft configured to have a first joint between a first bearing end of the shaft and a midsection and a second joint between the midsection and a second bearing end of the shaft, the first joint and second joints comprising a midsection portion at each joint and a complementary shaft portion of the respective first and second bearing ends. An embodiment of the disclosed method may also include removing 320 a first coupling configured to hold the first joint portions together during a rotation of the sectioned shaft and allow a decoupling of the first portions otherwise.

Maintenance may also include removing the top and/or back cover of the machine. Bolts may be removed on the coupling with common hex wrench. Lift the shaft out. Loosen the end nut. Remove the blade. The disclosure includes dropping in one of a shaft 10, 100 and 200. Tighten the bolts on the coupling using common hex wrench. Put the top cover back on.

The three sections of the shaft can be machined from raw material independently. However, a better way of making the sections with higher precision is to make one continuous shaft and then cut it into three sections using, for example, electrical discharging machining (WEDM). Due to its minimal material consumption (amount of material removed from the shaft), the resulting three sections will have excellent concentricity, which ensures minimal vibration and noise when the shaft is in use.

In order to make the sectioned and removable shaft, the simplest cutting of a monolithic shaft is orthogonally to an edge or the surface of the shaft in a key-hole type of cut on both ends of the shaft. Other types of cuts are comprised in the disclosure such as an acute edge to the surface of the shaft. These cuts have the advantage of zero change in concentricity due to the loss of material. The three sections can be pushed tightly together to eliminate the tiny gap produced by a WEDM.

The two cuts can be made different in shape or orientation to prevent the operator from installing the shaft the wrong direction. In an embodiment there is just one cut on the shaft that enables the shaft to become two pieces. The nut 4 that tightens the blades is on the side near the cut. After the coupling is removed, the shaft comes out together with one bearing and one supporting block (on the right). The chain side (left) remains in the machine.

This disclosure may very well be used on power strippers that only have front pairs of shafts. It may also be used on a single-blade stripper if the blade is difficult to remove otherwise. The present disclosure may also be used on many types of wire strippers, i.e. manual or powered, rotating blade or stationary blade types. The present disclosure may also be used on an adjustable-hole wire stripper. The present disclosure satisfies the long felt need in the market place for an adjustable one-hole stripper machine with improved wire driving performance.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents to be included by reference in a non-provisional utility application.

What is claimed is:

1. A wire stripper device, comprising:
   a first bearing;
   a second bearing;
   a cylindrical shaft extending horizontally along a shaft axis, the shaft having a first bearing end supported by the first bearing, a second bearing end supported by the second bearing, and a midsection between the first and second bearings; and
   a first joint configured to join the midsection with the first bearing end, said first joint comprising all structures that transfer torque between the midsection and the first bearing end, and all structures that ensure alignment of the midsection with the first bearing end,
   said midsection and first bearing end being terminated at abutting end structures within said first joint, each of said end structures consisting of one or more end structure surfaces, the normal vectors of which are directed in a plurality of directions, all of the normal vectors at all points on all of the end structure surfaces being parallel to a single plane that contains the shaft axis,
   each of said end structure surfaces of said midsection end structure being adjacent and parallel at all points to a complimentary end structure surface of said end structure of said first bearing end, said end structures being configured to allow separation of the midsection from the first bearing end by relative displacement along the shaft axis and by relative displacement in a direction perpendicular to the shaft axis, a diameter of the shaft when the first joint is fully assembled being uniform along a first uniform length that extends through the first bearing and through the first joint, and said first joint being configured without any structure or component, other than the end structure surfaces, that is disposed radially within the diameter of the shaft.

2. The wire stripper device of claim 1, wherein the midsection comprises at least one cutting blade.

3. The wire stripper device of claim 1, wherein the first joint is hinged, the hinge configured to allow a tangential movement of one of the bearing ends relative to the other bearing end.

4. The wire stripper device of claim 1, wherein the end structures comprise a half-lap configuration, whereby the end structures overlap in the first joint and are reduced to approximately half of their thickness where they overlap.

5. The wire stripper device of claim 1, wherein the shaft portion of the first bearing end and the complementary shaft portion of the midsection at the first joint comprise a cylindrical wedge configuration.

6. A wire stripper device, comprising:
a first bearing;
a second bearing;
a cylindrical shaft extending along a shaft axis, the shaft having a first bearing end supported by the first bearing, a second bearing end supported by the second bearing, and a midsection between the first and second bearings;
a first joint configured to join the midsection with the first bearing end, said first joint comprising all structures that transfer torque between the midsection and the first bearing end, and all structures that ensure alignment of the midsection with the first bearing end; and
a second joint configured to join the midsection with the second bearing end, said second joint comprising all structures that transfer torque between the midsection and the second bearing end, and all structures that ensure alignment of the midsection with the second bearing end,
said midsection and first bearing end being terminated at abutting first end structures within said first joint, each of said first end structures consisting of one or more first end structure surfaces, the normal vectors of which are directed in a plurality of directions, all of the normal vectors at all points on all of the first end structure surfaces being parallel to a single first plane that contains the shaft axis,
each of said first end structure surfaces of said midsection first end structure being adjacent and parallel to a complimentary first end structure surface of said first end structure of said first bearing end,
said midsection and second bearing end being terminated at abutting second end structures within said second joint, each of said second end structures consisting of one or more second end structure surfaces, the normal vectors of which are directed in a plurality of directions, all of the normal vectors at all points on all of the second end structure surfaces being parallel to a single second plane that contains the shaft axis,
each of said second end structure surfaces of said midsection second end structure being adjacent and parallel at all points to a complimentary second end structure surface of said second end structure of said second bearing end,
said end structures of said first and second joints being configured to allow separation of the midsection of the shaft from the first and second bearing ends by relative displacement along the shaft axis and by relative displacement in a direction perpendicular to the shaft axis,
a diameter of the shaft when the first and second joints are fully assembled being uniform along a first uniform length that extends through the first bearing and through the first joint, and along a second uniform length that extends through the second bearing and through the second joint, and
said first and second joints being configured without any structure or component, other than the end structure surfaces, that is disposed radially within the diameter of the shaft.

7. The wire stripper device of claim 6, wherein the midsection is configured to receive at least one cutting blade.

8. The wire stripper device of claim 6, wherein the first joint comprises a first removable coupling configured to hold the first end structures together and the second joint comprises a second coupling configured to hold the second end structures together during a rotation of the shaft and to allow a decoupling of the first and second end structures otherwise.

9. The wire stripper device of claim 8, wherein a width of each of the first and second couplings is configured to be equal to or wider than the respective first and second end structures when the first and second joints are fully assembled.

10. A method of maintaining a wire stripper device configured according to claim 8,
the method comprising:
removing the first and second couplings from the first and second joints;
separating the first and second bearing ends from the midsection and from each other at the first and second joints; and
removing the midsection of the shaft from the wire stripping device.

11. The wire stripper device of claim 6, wherein one of the first joint and the second joint are hinged, the hinge configured to allow a tangential movement of the midsection relative to the respective bearing end based on a release of an opposing end of the midsection.

12. The wire stripper device of claim 6, wherein the first and second end structures comprise half-lap structures that overlap in their respective joints and are reduced to approximately half of their thickness where they overlap.

13. The wire stripper device of claim 6, wherein both the first joint and the second joint comprise a wedge midsection facing away from a longitudinal center of the midsection.

* * * * *